United States Patent [19]

Sidwell et al.

[11] Patent Number: 5,025,164

[45] Date of Patent: Jun. 18, 1991

[54] ANTISTATIC LEAD SCREENS FOR USE WITH X-RAY FILMS

[75] Inventors: Lloyd G. Sidwell; Conrad E. Miller, both of Hendersonville, N.C.

[73] Assignee: E. I. Du Pont de Nemours and Company, Wilmington, Del.

[21] Appl. No.: 490,071

[22] Filed: Mar. 7, 1990

[51] Int. Cl.[5] .................. G03B 42/00; G03C 5/17; G21K 4/00

[52] U.S. Cl. .................. 250/483.1; 250/484.1

[58] Field of Search .................. 250/483.1, 484.1, 327.2

[56] References Cited

U.S. PATENT DOCUMENTS

| | | | |
|---|---|---|---|
| 4,059,768 | 11/1977 | Landeghem et al. | 250/483.1 |
| 4,501,683 | 2/1985 | Arakawa et al. | 252/301.26 |
| 4,501,971 | 2/1985 | Ochiai | 250/483.1 |
| 4,845,369 | 7/1989 | Arakawa et al. | 250/484.1 |
| 4,863,826 | 9/1989 | Arakawa et al. | 430/138 |

FOREIGN PATENT DOCUMENTS

| | | | |
|---|---|---|---|
| 0143074 | 8/1951 | Australia | 250/483.1 |
| 155900 | 7/1986 | Japan | 250/483.1 |

*Primary Examiner*—Constantine Hannaher
*Assistant Examiner*—Jacob M. Eisenberg

[57] ABSTRACT

An improved intensifying lead screen for use with photographic, industrial X-ray films, having a low propensity to produce electrostatic changes, is described. This screen comprises a lead foil adhesively applied to a polyester support with an overcoat or protective layer applied over the lead layer and coated thereon, a layer of a fluorosurfactant.

4 Claims, 1 Drawing Sheet

ANTISTATIC LEAD SCREENS FOR USE WITH X-RAY FILMS

BACKGROUND OF THE INVENTION

1. Field of the Invention

This invention relates to the field of radiography and more specifically to lead foil screens used to intensify images produced using industrial radiography. Still more particularly, this invention relates to an improved lead screens used with photographic elements associated therewith 2. Discussion of the Prior Art Industrial radiography is a system used to determine whether or not defects might exist in large, dense items such as the girders of bridges or the fuselages of aircraft, for example. This system is also used to determine defects within smaller items which cannot be visually inspected. Conventionally, a special photographic film is placed near the device to be radiographed, and X-radiation is applied thereto. Even though photographic, radiographic elements are not particularly sensitive to X-rays, large doses of these X-rays can be applied since they will not harm the items being examined in this manner. The use of lead screens and foils in conjunction with industrial, radiographic photographic elements to produce quality images, is well-known. These screens are conventionally comprised of a lead coating on paper or cardboard. These screens serve to intensify the radiographic image somewhat and find great utility within the described system. Flexibility is important within this system since it is sometimes necessary to wrap the film and screen around the item to be radiographed in order to obtain an image of the entire interior thereof. In a copending application, Robinette, U.S. Ser. No. 07/398.104, filed 08/24/89, the subject of which is incorporated herein by reference, there is described a flexible lead or lead oxide absorbing screen for X-ray photography comprising a flexible, polymeric support, an adhesive layer, a layer of lead or lead oxide dispersed in a binder and coated over said adhesive layer, and an overcoat layer. These flexible screens are much improved over the conventional paper or cardboard support used by the prior art and do not absorb moisture which can adversely affect the photographic emulsion associated therewith. Additionally, these flexible screens have excellent film/screen contact which improves the images produced when the screens are exposed conventionally with a photographic emulsion containing element, for example. Also, the flexible screens do not tend to absorb X-radiation, a process which interferes with the production of an X-ray image on the photographic film. However, these flexible screens produced on polymeric supports tend to produce unwanted electrostatic changes during normal use.

SUMMARY OF THE INVENTION

It is an object of this invention to provide a flexible X-ray screen lead intensifying system coated on a polymeric support and one that has a reduced propensity to produce static during the process of use. These and yet other objects are achieved by providing a lead absorbing screen for an X-ray photographic element which comprises a flexible, polymeric support; an adhesive layer applied to said support; a flexible layer of lead or lead oxide dispersed in a binder and applied over said adhesive layer; and an overcoat layer applied over said flexible layer; the improvement comprises said overcoat layer containing on its surface a sufficient amount of a fluorosurfactant to reduce the propensity of the screen to produce static.

DETAILS OF THE INVENTION

Figure 1:
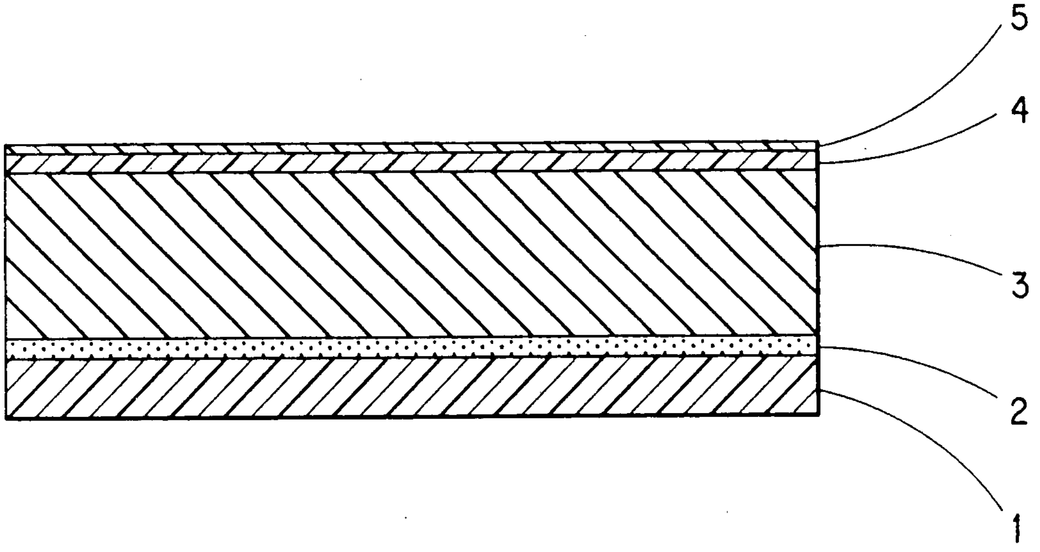
FIG. 1 is a side view showing of the lead screen of this invention.

Referring now specifically to the drawing which is an integral part of this invention, FIG. 1 shows a lead screen of this invention in which 1 is a polyester support, 2 is an adhesive layer, 3 is a lead or lead oxide foil layer, 4 is an overcoat or protective layer, and 5 is the antistatic layer of this invention which is applied supra to overcoat layer 4.

It was surprising to find that the application of fluorosurfactant wetting or dispersing agents would provide such static protection to these, very special X-ray intensifying screens. Normally, static protecting agents are incorporated within the top surface of an element and these static protecting agents are usually not surfactants per se. Additionally, conventionally and well-known antistatic agents, when in contact with photographic film elements, tend to create adverse sensitometric results such as fog.

Since the X-ray intensifying screen element of this invention is flexible, it can be cut, shaped and packaged to match the industrial application without fear of creating static which might interfere with the images produced in conjunction with any photographic element exposed therewith.

The basic intensifying screen structure is as described in the aforementioned Robinette application, all of which is incorporated herein by reference. All of the standard advantages encountered by the use of that structure are also achieved in this structure with the added advantage of having excellent protection against the creation of any static charges which may build up on the surface thereof.

Fluorosurfactants useful within the ambit of this invention are generally mixtures of fluorinated hydrocarbons and fluorinated ethoxy telomere alcohols among others. They are generally soluble in water or water-alcohol mixtures, are generally considered to be anionic or nonionic and have low surface tension when used in low amounts as required by this invention, for example. They include, among others, the following ingredients or mixture of ingredients, all sold under the Tradename "Zonyl" by E. I. du Pont de Nemours & Co., Wilmington, DE.:

a) a mixture of 40% ethoxylated Telomere B alcohol in 2 propanol and water (1:1) and 60% ethoxylated 3-omega-polyfluoro-1-alkanol, CAS #57534-41-5 (Zonyl ® FSN-100).
b) an equal mixture of the above (Zonyl ®FSO).
c) 47% poly(difluoromethylene)-alpha-[2-(acetyloxy)-3-{(caboxymethyl) dimethyimino}propyl]-omega-fluorohydroxide, inner salt in glacial acetic acid (Zonyl ® FSK).
d) 50% poly(difluoromethylene), alpha-[2-{(2-carboxyethyl)thio}ethyl]-omega-fluoro, lithium salt, 225 isopropyl alcohol, 28% water and [3-(3-omega-polyfluoro alkylthio) propionic acid, lithium salt] -CAS #65530-30-69-0 (Zonyl ® FSA).
e) Unneutralized Telomere B phosphate; poly(difluoromethylene) alpha-fluoro-omega[-(phosphonoxy)-ethyl] -mixture of difluoromethylene (Zonyl ® UR).

Additionally, the following fluorosurfactants which are nonionic and meet the aforesaid limitations and specifications, include the following:

| Compound | Manufacturer |
|---|---|
| Fluorad ® FC-170C | 3M |
| Fluowet ® OT | Hoechst |
| FT-219 | Bayer (Mobay) |
| Forfac ® 110 | ATO Chem. |
| Lodyne ® S1-7B | Ciba-Geigy |
| ABIL ® B8842 | Goldschmidt |
| ABIL ® B8843 | " |
| ABIL ® B8851 | " |
| ABIL ® B8866 | " |
| ABIL ® B8878 | " |
| ABIL ® B8894 | " |
| Silwet ® L77 | Union Carbide |
| Silwet ® L-720 | " |
| Silwet ® L7601 | " |
| Silwet ® L7602 | " |
| Silwet ® L7604 | " |
| Silwet ® L7605 | " |
| Silwet ® L7607 | " |
| Dow Corning ® 190 | Dow Corning |
| Dow Corning ® 193 | " |
| Dow Corning ® 197 | " |
| Dow Corning ® 1315 | " |

The addresses of the manufactures of the surfactants listed above are as follows:

3M Co., Minneapolis-St. Paul, MN

Hoechst, 6230 Frankfurt am Main 80, W. Germany

Bayer (Mobay) Chem. Corp., Penn Lincoln Pkwy, W. Pittsburgh, PA 15205

ATO Chem. Co., P. 0. Box 607, Glen Rock, NJ 07452

Ciba-Geigy Corp., Co., Ardsley, NY 10502-2699

Goldschmidt Chem. Co., Rt. 2, Box 1299, Hopewell, VA 23860

Union Carbide Co., 39 Old Ridgebury Rd., Danbury, CT 06817-0001

Dow Corning Chem. Co., Midland, MI 48686-0997

These materials can be further diluted with water to the range of about 0.1 to about 5.0% and then applied to the overcoat layer of the element of this invention. This dilution is important since at levels higher than about 10%, static protection is minimal and the surface is not as useful. We prefer using the fluorosurfactant Zonyl ® FSN described in a), above, at a concentration of about 0.5% in water. The solutions can be applied by any of the conventional means such as by coating methods or by simply wiping on the solution.

The overcoat or barrier layer (5 in the drawings) present on the lead foil screen of this invention is a so-called lacquer layer. Any of the well-known lacquers may be used to provide a thin, tough, transparent overcoat for the lead foil screen of this invention. The overcoat will provide a more intimate contact between the screen and the photographic element and will provide even better results. Additionally, the overcoat tends to protect the lead foil layer and thus reduce defects caused be improper handling. The film overcoats may be applied using an adhesive similar to that employed to insure the lead foil sticks to the film. The lacquers may be applied as a liquid by any conventional manner and dried to form a tough, smooth overcoat finish to the element. The fluorosurfactant layer of this invention is then applied supra to said overcoat layer.

This invention will now be illustrated by the following specific examples of which Example 1 represents the best mode. All percentages are by weight unless otherwise indicated.

EXAMPLE 1

In order to exemplify this invention, the following screen was prepared:

A thin (ca. 2.95 mils), clear polyethylene terephthalate film support (Mellinex ®, ICI Corp.) was coated with an adhesive (Liofol UK 2600, Henkel GbH, Dusseldorf, W. Germany) at 3 g/m$^2$ (ca. 1 mil in thickness). A 0.275 mm lead foil (described above) was then laminated to this support and allowed to dry to insure good adhesion thereto. Another layer of the aforementioned adhesive was then applied on top of the lead foil layer and a lacquer layer comprising polymerized polyvinyl chloride (Product #90LA743, Gebr-Schmidt, W. Germany) was coated on this adhesive layer to a thickness of ca. 0.5 g/m$^2$ and dried. A thin layer of 0.5% Zonyl ® FSN in water, as described above, was then applied over the lacquer layer and the structure dried thoroughly. A flexible, lead screen representing this invention, was obtained from this structure.

In order to test the efficacy of the lead foil screen prepared above, 3.3" × 12" samples of the screen were placed on both sides of a commercially available, industrial X-ray photographic film element (NDT70, E. I. du Pont de Nemours & Co., Wilmington, DE) in a conventional vacuum pack in order to insure intimate contacting of film and screen. These samples were placed in a tropical oven for one to two weeks at 72° F. and 65% relative humidity. The films were then removed from the vacuum pack which generally creates friction between film and screen and produces static. For control purposes, samples of the same film were placed in vacuum packs with the same lead intensifying screen with no fluorosurfactant on the lacquer layer (Control 1), with the fluorosurfactant incorporated in the lacquer layer (Control 2) and with no lacquer layer and the fluorosurfactant applied directly on the lead layer Control 3). The films were examined for the generation of static by development in standard X-ray developer followed by fixing, washing and drying. Any static marks show up on this developed film in the form of "tree" or "lightning bolt" marks and are easily seen. The films were also examined for sensitometric results by exposure at 200 kVp and 10 ma to an X-ray source through a step wedge. In all cases, the sensitometry of the films were generally equivalent. However, the propensity to generate static was markedly different as shown below:

| Sample | | Static Observed |
|---|---|---|
| Control 1 - | no fluorosurfactant | Varied Amounts of Marks |
| Control 2 - | fluorosurfactant in lacquer layer | " |
| Control 3 - | fluorosurfactant on lead layer | Large Numbers of Marks |
| Of This Invention | | One, Small Mark |

EXAMPLE 2

In yet another test of the efficacy of using the fluorosurfactant as an antistatic coating, lead screens similar to those described in Example 1 were prepared and samples of each were tested by placing one sheet of NDT X-ray film between two 3.3" × 12" intensifying screens and placing this package on a hard, smooth surface such a lab bench top, for example. A two kilogram brass, cylindrical (58 mm diameter) weight was then rolled over the stack twice in the long (12") direction. The top screen in each case was then peeled off carefully so as to minimize the generation of any static. The X-ray film was lifted from the bottom screen in the same manner and the charge buildup was measured with an Electrostatic Meter, Model EM-7600, Plastic Systems, Marlboro, MA. The film samples were scanned with the electrometer electrode at a distance of one inch from the film surface. The antilog meter (0–10 KV) was observed and the highest reading recorded as kilovolts/inch with the following results where a higher number indicates a higher propensity to generated static:

| Sample | Average Reading (kv/inch) |
|---|---|
| Control 1 | 4.7 |
| Control 2 | 4.5 |
| Control 3 | 5.2 |
| Of This Invention | 1.9 |

According to these results, applying the fluorosurfactant as a layer on the overcoat layer of the screen of this invention reduced the propensity to generate static by almost 60% over the controls.

EXAMPLE 2

In yet another example, a number of other nonionic or anionic fluorosurfactants are tested on the overcoat layer of the screen of this invention. Good results in static protection are achieved in these samples.

EXAMPLE 4

In yet another example, the Zonyl® FSN is added at varying levels from 0.1% to 10% diluted in water with efficacious results in reducing the propensity of the screen to produce static.

We claim:

1. A lead absorbing screen for an X-ray photographic element which comprises a flexible, polymeric support; an adhesive layer applied to said support; a flexible layer of lead or lead oxide dispersed in a binder and applied over said adhesive layer; and an overcoat layer applied over said flexible layer: the improvement comprises overcoat layer containing on its surface a sufficient amount of a fluorosurfactant to reduce the propensity of the screen to produce static.

2. The screen of claim 1 wherein said overcoat layer is comprised of a lacquer layer.

3. The screen of claim 2 wherein said fluorosurfactant is taken form the group consisting of:

a) a mixture of 40% ethoxylated Telomere B alcohol in 2 propanol and water (1:1) and 60% ethoxylated 3-omega-polyfluoro-1-alkanol;

b) a mixture of 50% ethoxylated Telomere B alcohol in 2 propanol and water (1:1) and 50% ethoxylated 3-omega-polyfluoro-1-alkanol;

c) 47% poly(difluoromethylene)-alpha[2-(acetyloxy)-3-{(carboxymethyl)dimethylimino}propyl]-omega-fluorohydroxide, inner salt in glacial acetic acid;

d) 50% poly(difluoroemthylene), alpha-[2-{(2-carboxyethyl)thio}ethyl]-omega-fluoro, lithium salt, 225 isopropyl alcohol, 28% water and [3-(3-omega-polyfluoro alkylthio) propionic acid, lithium salt]; and, e) Unneutralized Telomere B phosphate poly-(difluoromethylene)alpha-fluoro-omega [-(phosphonoxy)-ethyl]-mixture of difluoromethylene.

4. The screen of claim 3 wherein said layer of lead or lead oxide comprises 1.5% Sn, 2.5% Sb, and 96.0% Pb of a thickness of 0.01 to 0.04 mm and said fluorosurfactants are diluted to a connection of from 0.1 to 10.0% by weight.

* * * * *